United States Patent
Otten

(10) Patent No.: US 12,227,050 B2
(45) Date of Patent: Feb. 18, 2025

(54) SUSPENSION SYSTEM WITH OPTIMIZED POSITION SENSITIVE DAMPING AND SYSTEM AND METHOD FOR OPTIMIZING THE SAME

(71) Applicant: Ford Global Technologies, LLC, Dearborn, MI (US)

(72) Inventor: Erik Otten, Lara (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/422,675

(22) Filed: Jan. 25, 2024

(65) Prior Publication Data
US 2024/0157749 A1   May 16, 2024

Related U.S. Application Data

(63) Continuation of application No. 17/024,864, filed on Sep. 18, 2020, now Pat. No. 11,919,352.

(51) Int. Cl.
*B60G 17/019*   (2006.01)
*B60G 17/0165*   (2006.01)

(52) U.S. Cl.
CPC ....... *B60G 17/0165* (2013.01); *B60G 17/019* (2013.01); *B60G 2204/62* (2013.01);
(Continued)

(58) Field of Classification Search
CPC .............. B60G 17/019; B60G 17/0165; B60G 2400/60; B60G 2400/91; B60G 2500/11;
(Continued)

(56) References Cited

U.S. PATENT DOCUMENTS

| 11,521,382 B2 * | 12/2022 | Grant | G06V 10/25 |
| 11,919,352 B2 * | 3/2024 | Otten | B60G 17/019 |

(Continued)

OTHER PUBLICATIONS

Abu Bakar et al., Semi active suspension system performance under random road profile excitations, 2015, IEEE, p. 93-97 (Year: 2015).*

(Continued)

*Primary Examiner* — McDieunel Marc
(74) *Attorney, Agent, or Firm* — Burr & Forman LLP; Lorne Forsythe

(57) ABSTRACT

A method of optimizing a suspension system to avoid pitch resonance may include determining pitch characteristics of a vehicle for a terrain profile and speed range via a model associated with the vehicle, decoupling front and rear axles by removing pitch inertia from the model, and determining optimized damping for a main damper of a position sensitive damper over a linear range of wheel travel in a bounce control zone based on the pitch characteristics. The method may further include recoupling the front and rear axles by adding the pitch inertia back into the model, and selecting a secondary damper associated with a compression zone or a secondary damper associated with a rebound zone as a selected damper for adjustment based on which of the front and rear axles is limiting. The method may also include performing a damping adjustment to the selected damper and cyclically repeating selecting the secondary damper and performing the damping adjustment until pitch resonance is suppressed.

18 Claims, 7 Drawing Sheets

(52) U.S. Cl.
CPC .............. *B60G 2400/204* (2013.01); *B60G 2400/252* (2013.01); *B60G 2400/60* (2013.01); *B60G 2400/821* (2013.01); *B60G 2400/91* (2013.01); *B60G 2401/21* (2013.01); *B60G 2500/11* (2013.01)

(58) Field of Classification Search
CPC ........ B60G 2400/204; B60G 2400/821; B60G 2400/252; B60G 2204/62; B60G 2401/21
See application file for complete search history.

(56) References Cited

U.S. PATENT DOCUMENTS

| | | | | |
|---|---|---|---|---|
| 2022/0134830 A1* | 5/2022 | Voelkel | ................ | F16F 9/3292 |
| | | | | 188/313 |
| 2023/0213081 A1* | 7/2023 | Michener | .............. | B60G 13/08 |
| | | | | 188/266.1 |

OTHER PUBLICATIONS

Hamilton, Computer-Optimized Adaptive Suspension Technology (COAST), 1985, IEEE, p. 355-363 (Year: 1985).*

Peng et al., An experimental study of vehicle suspension semi-active control with skyhook controller and magneto-rheological dampers, 2017, IEEE, p. 7427-7429 (Year: 2017).*

Ikenaga et al., Active suspension control of ground vehicle based on a full-vehicle model, 2000, IEEE, p. 4019-4024 (Year: 2000).*

* cited by examiner

SUSPENSION SYSTEM WITH OPTIMIZED POSITION SENSITIVE DAMPING AND SYSTEM AND METHOD FOR OPTIMIZING THE SAME

CROSS-REFERENCE TO RELATED APPLICATIONS

This application is a continuation of U.S. application Ser. No. 17/024,864 filed on Sep. 18, 2020, the entire contents of which are hereby incorporated herein by reference.

TECHNICAL FIELD

Example embodiments generally relate to vehicle suspension and, more particularly, relate to a suspension system with optimally tuned suspension elements to provide maximum capability and driver confidence for driving in situations with repetitive undulations.

BACKGROUND

Vehicles commonly employ independent suspension that allows each wheel to move relative to the vehicle chassis independent of the other wheels. The components and geometries used for independent suspension designs can vary to some degree. However, a typical independent suspension system will employ shock absorbers (or simply "shocks") that are designed to provide damping for pitch (i.e., oscillation about a lateral axis of the vehicle). The shocks generally resist compression and rebound with damping forces that are applied over a range of travel of a piston rod.

The shocks selected for a particular vehicle are generally chosen based on the expectation of normal pitch scenarios that are encountered during routine driving conditions. Meanwhile, high performance vehicles, or vehicles that are designed to be operated off-road, may encounter levels of pitch that are much higher than normal, and may therefore reach or at least more commonly approach the limits of the range of travel of the piston rod within the shock. To handle situations where one of the limits is reached or approached, shocks have been designed with additional dampers (or spring aids) near the limits.

Repetitive sets of relatively large undulations (sometimes referred to as "whoops") can cyclically put the shock into the ranges where the additional dampers may act. The increased damping being cyclically applied may provide a form of feedback or excitation into the system that can build to the point of resonance at certain speeds. This can create a speed, or even a range of speeds, at which pitch resonance may be approached for transit over whoops. Operators will tend to drive below or above such speed (or speeds). However, it would be preferable to obviate any need to avoid any such speeds or ranges entirely.

BRIEF SUMMARY OF SOME EXAMPLES

In accordance with an example embodiment, a position sensitive suspension system for a vehicle may be provided. The system may include a plurality of ride height sensors at locations of a chassis of the vehicle corresponding to respective wheels of the vehicle, a plurality of active position sensitive dampers that are each associated with one of the respective wheels of the vehicle, and a controller operably coupled to the ride height sensors and the active position sensitive dampers. The controller may be configured to determine a payload estimate based on information received from the ride height sensors. The controller may be further configured to provide an adjustment to compensation damping of at least one of the active position sensitive dampers based on the payload estimate and vehicle speed.

In another example embodiment, a method of optimizing a suspension system to avoid pitch resonance may be provided. The method may include determining pitch characteristics of a vehicle for a terrain profile and speed range via a model associated with the vehicle, decoupling front and rear axles by removing pitch inertia from the model, and determining optimized damping for a main damper of a position sensitive damper over a linear range of wheel travel in a bounce control zone based on the pitch characteristics. The method may further include recoupling the front and rear axles by adding the pitch inertia back into the model, and selecting a secondary damper associated with a compression zone or a secondary damper associated with a rebound zone as a selected damper for adjustment based on which of the front and rear axles is limiting. The method may also include performing a damping adjustment to the selected damper and cyclically repeating selecting the secondary damper and performing the damping adjustment until pitch resonance is suppressed.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
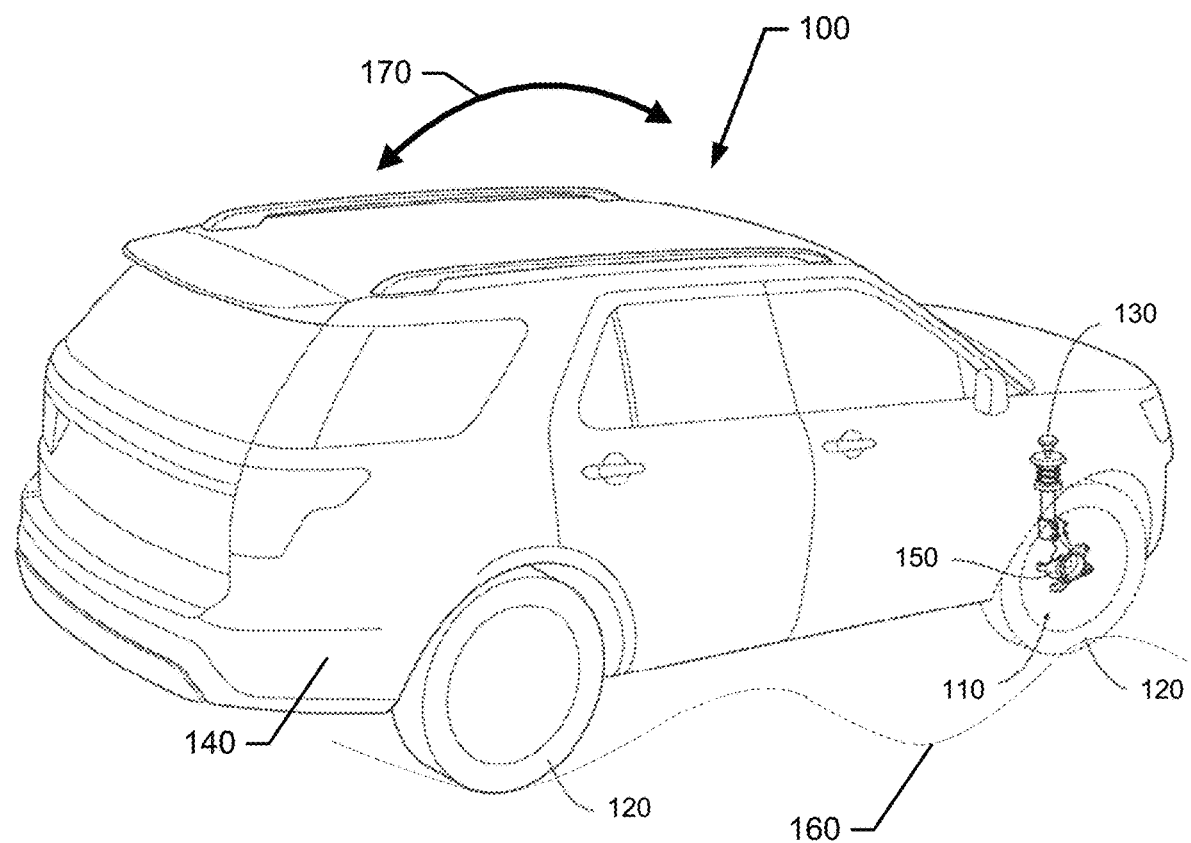
FIG. 1 illustrates a perspective view of a vehicle encountering undulating terrain and certain components of a suspension system of the vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some embodiments may provide an improved suspension system that employs position sensitive damping that has been optimized to address pitch resonance, and a corresponding methodology for performing the optimization. By avoiding pitch resonance, contact between the wheels and the ground can be increased in even the most challenging of contexts, such as riding over whoops. As a result, vehicle performance and driver satisfaction may also be improved.

FIG. 1 illustrates a perspective of a vehicle 100 employing a suspension system 110 of an example embodiment. The suspension system 110 includes a plurality of wheels 120 in contact with the ground, and a position sensitive damper 130 (e.g., a shock absorber or shock) disposed between each one of the wheels 120 and a body 140 or chassis of the vehicle 100. In some cases, the wheel 120 may be operably coupled to the position sensitive damper 130 via a steering knuckle 150. Additional links may also be provided between the chassis and the steering knuckle 150 to stabilize the wheel 120, but such links are outside the scope of example embodiments.

As shown in FIG. 1, undulating terrain 160 (or whoops) that is repetitive in nature may be encountered by the vehicle 100. The body 140 of the vehicle 100 may tend to move up and down pitching cyclically as shown by double arrow 170 as the undulating terrain 160 is traversed. The pitching may correspondingly cause cyclic compression and extension of the position sensitive damper 130 of the suspension system 110, as the position sensitive damper 130 attempts to dampen out the motion. Because the position sensitive damper 130 necessarily has a limited amount of linear travel for the piston rod therein, a certain degree of harshness could be encountered when the limit is reached at either end. To reduce this harshness, and provide a smoother ride for passengers, example embodiments may configure the position sensitive damper 130 to provide additional hydraulic force near the respective limits. The additional hydraulic force may, however, provide positive feedback into the system. At certain speeds, as noted above, the positive feedback could excite the system toward pitch resonance, which would result in poor ride quality over the corresponding speed or range of speeds.

Figure 2:
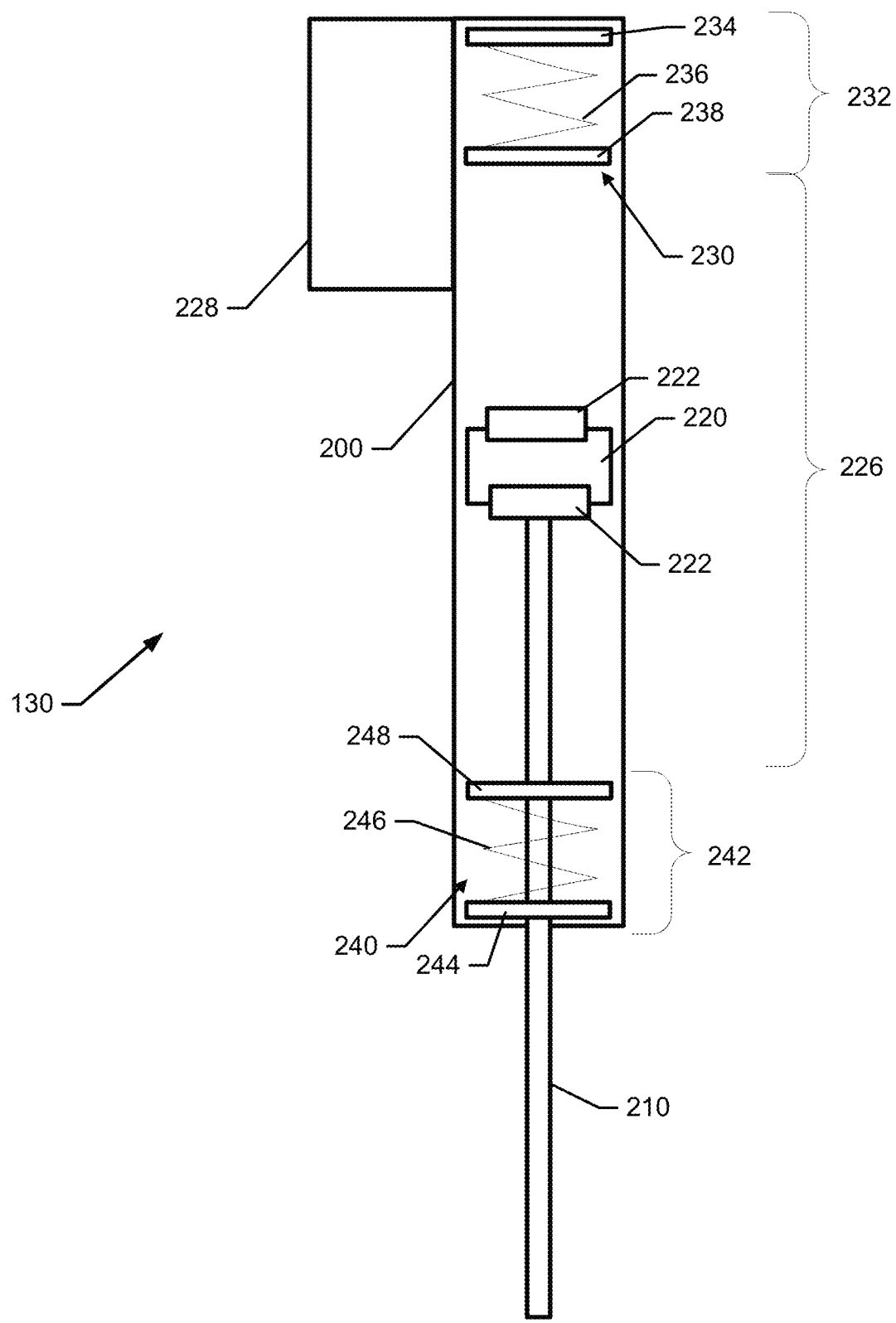
FIG. 2 illustrates a schematic diagram of a position sensitive damper in accordance with an example embodiment.

To avoid pitch resonance, example embodiments may further enable tuning of the position sensitive damper 130. In this regard, for example, the position sensitive damper 130 may be configured to include a main damper and two secondary dampers (e.g., a compression damper and a rebound damper) that are tunable in order to avoid pitch resonance. FIG. 2 illustrates a schematic diagram of the position sensitive damper 130 of an example embodiment in greater detail.

Referring now to FIG. 2, the position sensitive damper 130 may include a body 200 and a piston rod 210 that extends into one end of the body 200. At the opposite end of the body 200, a coupling member (not shown) may be provided with a bushing to facilitate operable coupling to the steering knuckle 150 of FIG. 1. The piston rod 210 may include a main damper 220 disposed at one end thereof. Meanwhile, the opposite end of the piston rod 210 may be configured to be operably coupled to the chassis of the vehicle 100. The body 200 may include a fluid (e.g., gas or oil) that is enabled to move from one side of the main damper 220 responsive to force being applied to the piston rod 210 in either direction. In this regard, for the example of FIG. 2, compression occurs when the main damper 220 and piston rod 210 move upward and rebound occurs when the main damper 220 and piston rod 210 move downward. In either case, the main damper 220 effectively creates separate chambers in which the fluid is compressed to oppose motion of the piston rode 210 and main damper 220. The compressed fluid resists motion of the main damper 220, but is enabled to pass by (or through) the main damper 220 in a controlled fashion. In some cases, it may be possible to adjust the amount of force exhibited by the main damper 220 (either in the design phase or after assembly), for example, by adjusting the amount of fluid in the body 200 or the rate at which fluid passes by or through the main damper 220.

In an example embodiment, the main damper 220 may include a control valve piston 222 on each of the compression side and the rebound side of the main damper 220, respectively. The control valve pistons 222 may each include control valves that are separately adjustable to define the characteristics of the main damper 220 with respect to the amount of force exerted for corresponding positioning of the main damper 220 within a main piston control zone 226 (e.g., a bounce control zone). An external reservoir 228 is also operably coupled to the body 200. The external reservoir 228 may be nitrogen charged to provide additional force adjustment capability for the position sensitive damper 130 without impacting the range of travel of the main damper 220. The external reservoir 228 may also provide added performance capability by enabling secondary dampers to generate end stop control and internal pressure balance.

As shown in FIG. 2, the position sensitive damper 130 may also include a first secondary damper 230 and a second secondary damper 240. The first secondary damper 230 may operate in a compression control zone 232 and may include a retaining ring 234, a spring 236, and a catch piston 238. Similarly, the second secondary damper 240 may operate in a rebound control zone 242 and may include a retaining ring 244, a spring 246, and a catch piston 248. Each of the catch pistons 238 and 248 may include control valves that are adjustable to define a corresponding amount of force exerted for corresponding positioning of the catch pistons 238/248 within the compression control zone 232 and the rebound control zone 242, respectively.

Although damping could be increased over the full length of travel of the main damper 220, doing so in isolation may make the ride experience poor as the harshness experienced for undulations or bumps encountered may be greater. Example embodiments enable the length of travel of the main damper 220 and/or the first and second secondary dampers 230 and 240 to be adjusted. As such, the size or range of the main piston control zone 226, the compression control zone 232, and the rebound control zone 242 may be adjusted. Example embodiments may also or alternatively enable the amount of force exerted by the main damper 220 and/or the first and second secondary dampers 230 and 240 to be adjusted. Thus, for example, control valves controlling flow through the catch pistons 238 and 248 and/or through the control valve pistons 222 of the main damper 220 may be adjustable.

During normal operation, the position sensitive damper 130 may operate in the main piston control zone 226, and damping may be controlled by the main damper 220. During any significant travel event (e.g., a bounce, jolt or undulation), the control valve pistons 222 may engage with the catch piston 238 or 248 of either the first or second secondary damper 230 and 240, respectively. This engagement may then begin to build pressure in the corresponding control zone (e.g., the compression control zone 232 or the rebound control zone 242) via compression of the fluid therein. The catch pistons 238 and 248 create separate zones that can have different force buildup characteristics than those of the main piston control zone 226. In this regard, the catch pistons 238 and 248 may, when encountered by the control valve piston 222 that corresponds thereto due to motion of the main damper 220, ramp up the force generated relatively quickly for increased smoothness and a controlled ride. Meanwhile, when the compression or rebound force is reduced, the system may disengage to allow for enhanced riding comfort.

Figure 3:
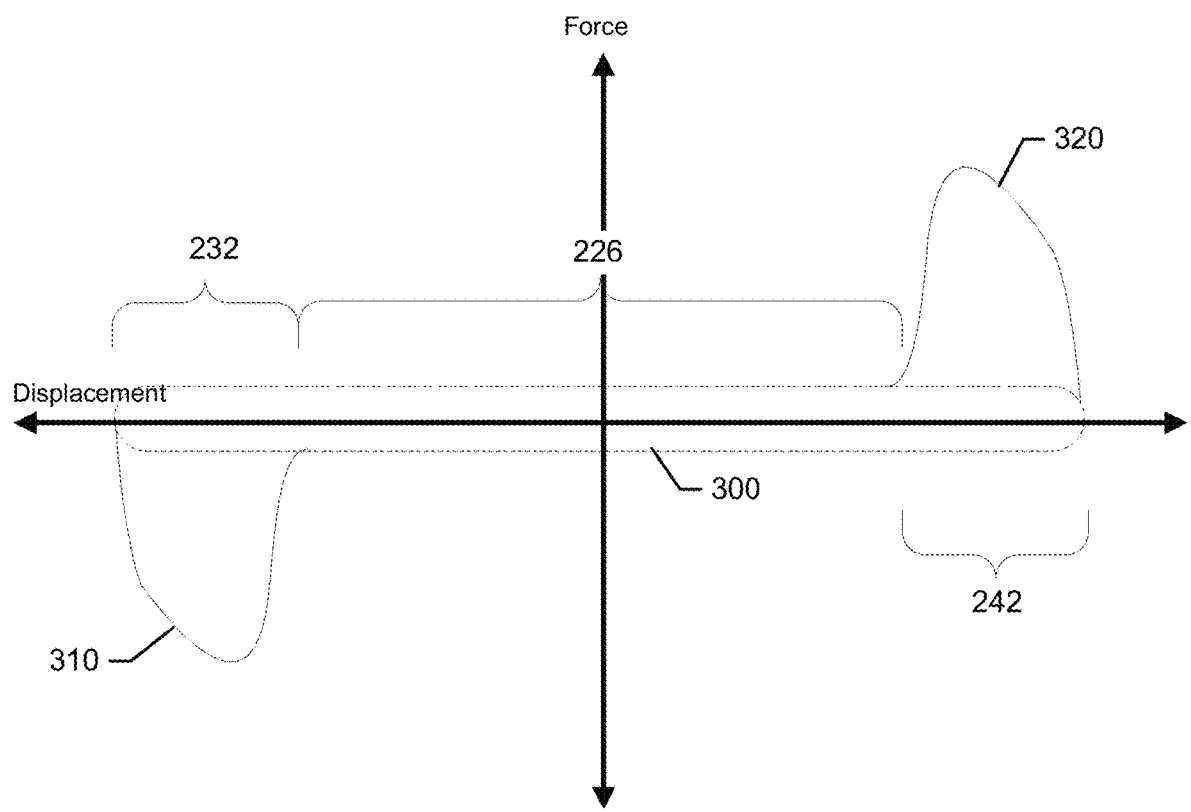
FIG. 3 illustrates a plot of force versus displacement for the position sensitive damper of FIG. 2 in accordance with an example embodiment.

FIG. 3 illustrates a plot of force vs. displacement for the main damper 220 of an example embodiment. In this regard, curve 300 illustrates a standard damper response (e.g., without the position sensitive damper 130 of an example embodiment) over the range of displacements from full compression to full rebound. FIG. 3 also illustrates the main piston control zone 226, the compression control zone 232 and the rebound control zone 242 for the position sensitive damper 130. Meanwhile, curve 310 illustrates a modification from the standard curve 300 due to inclusion of the first secondary damper 230 of FIG. 2, and curve 320 illustrates a modification from the standard curve 300 due to inclusion of the second secondary damper 240 of FIG. 2. As can be seen in FIG. 3, the main damper 220 may have the standard curve 300 response over the main piston control zone 226. However, curve 310 illustrates that a significantly larger force may be provided near the travel limit for displacement in the compression control zone 232, and curve 320 illustrates that a significantly larger force may be provided near the travel limit for displacement in the rebound control zone 242. Accordingly, for the same distance of displacement, in each of the compression control zone 232 and the rebound control zone 242, an increased amount of force may be provided relative to the force provided in the main piston control zone 226.

In an example embodiment, beyond simply being adjustable, a tuning process may be defined for a given vehicle design in order to ensure that each individual instance of the position sensitive damper 130 (i.e., those associated with the front and rear suspension) is tuned to provide smooth hydraulic force over the main piston control zone 226 with corresponding ramp up proximate to the end of the range of main damper 220 travel in the compression zone 232 and the rebound zone 242. The tuning process may be specifically employed to address pitch resonance (and the avoidance thereof) in some embodiments. However, similar concepts may also be employed to facilitate achieving other design objectives as well.

Figure 4:
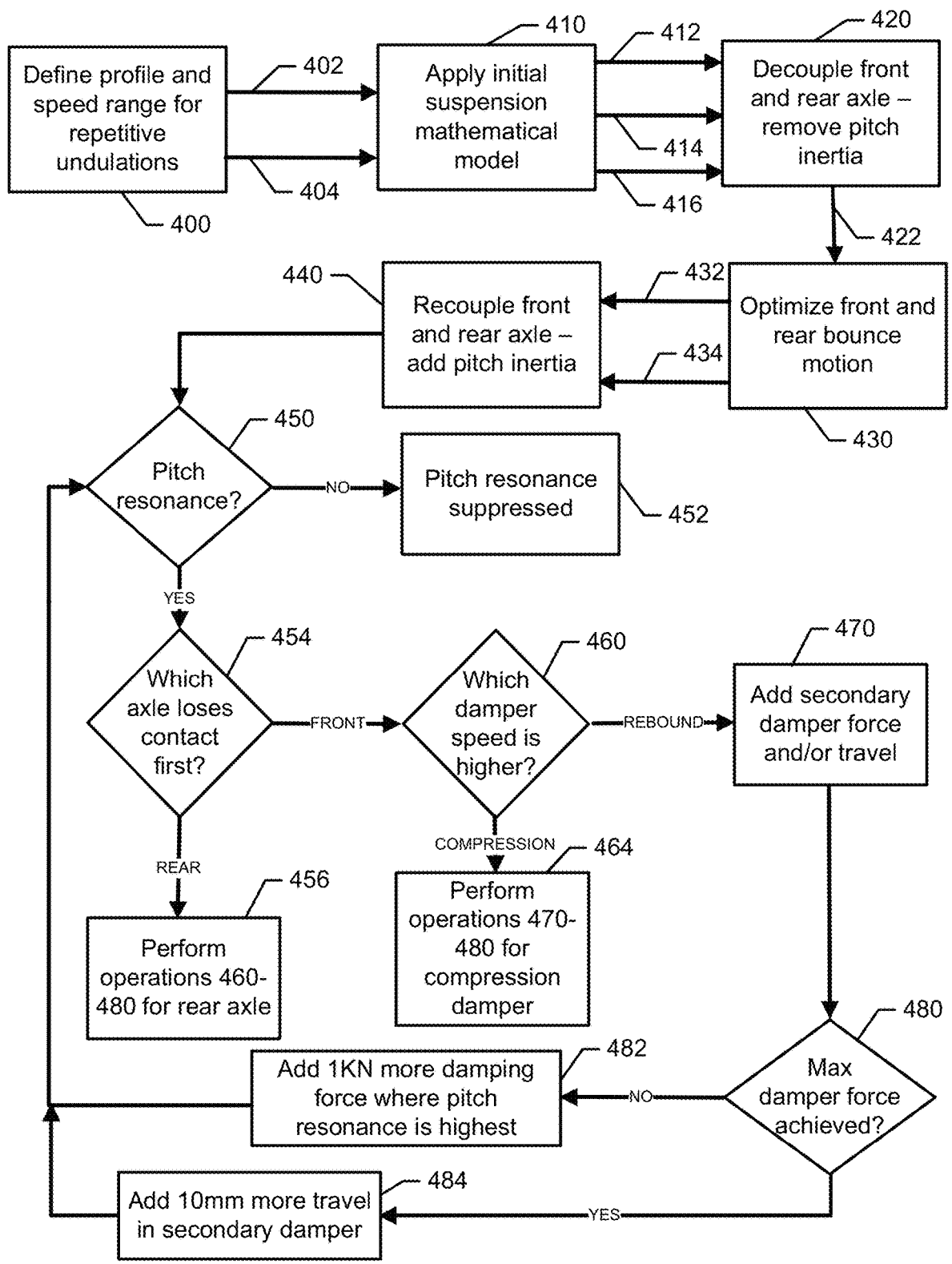
FIG. 4 illustrates a block diagram of a tuning or optimization process for a suspension system including the position sensitive damper of FIG. 2 in accordance with an example embodiment.

FIG. 4 illustrates a block diagram of a tuning process (or optimization algorithm) that may be employed in accordance with an example embodiment. Thus, for example, processing circuitry (e.g., a processor and memory) may be configured to perform the optimization algorithm or tuning process of FIG. 4 in order to define settings for the components of the position sensitive damper 130 to avoid pitch resonance.

Referring now to FIG. 4, the process may begin with the definition of a profile and speed range for repetitive undulations (e.g., whoops) at operation 400. Outputs from operation 400 may include an amplitude 402 of the undulations and a frequency 404. At operation 410, a mathematical model of the vehicle suspension system may be applied to the profile and speed range defined in operation 400. The mathematical model may include models of the front and rear axles separate from each other, and may be a computer aided engineering (CAE) model that is specific to the vehicle 100 being designed. Thus, the track, wheel base, and other components of the model may depend directly on the type of vehicle being modeled. The model may be applied to the profile and speed range defined in order to generate various outputs from the application of the model at operation 410 to define specific characteristics related to resonance for the vehicle model. These outputs may include a front axle bounce resonance frequency 412, a rear axle bounce resonance frequency 414 and the pitch resonance frequency 416.

Thereafter, at operation 420, the front and rear axles may be decoupled by removing pitch inertia from the model. This decoupling step may also be considered with main piston damping only (i.e., from the main damper 220 of FIG. 2). Thus, no position sensitive damping may be performed at this stage of the process. An output of operation 420 may include amplitude, frequency, and velocity information 422.

Figure 5:
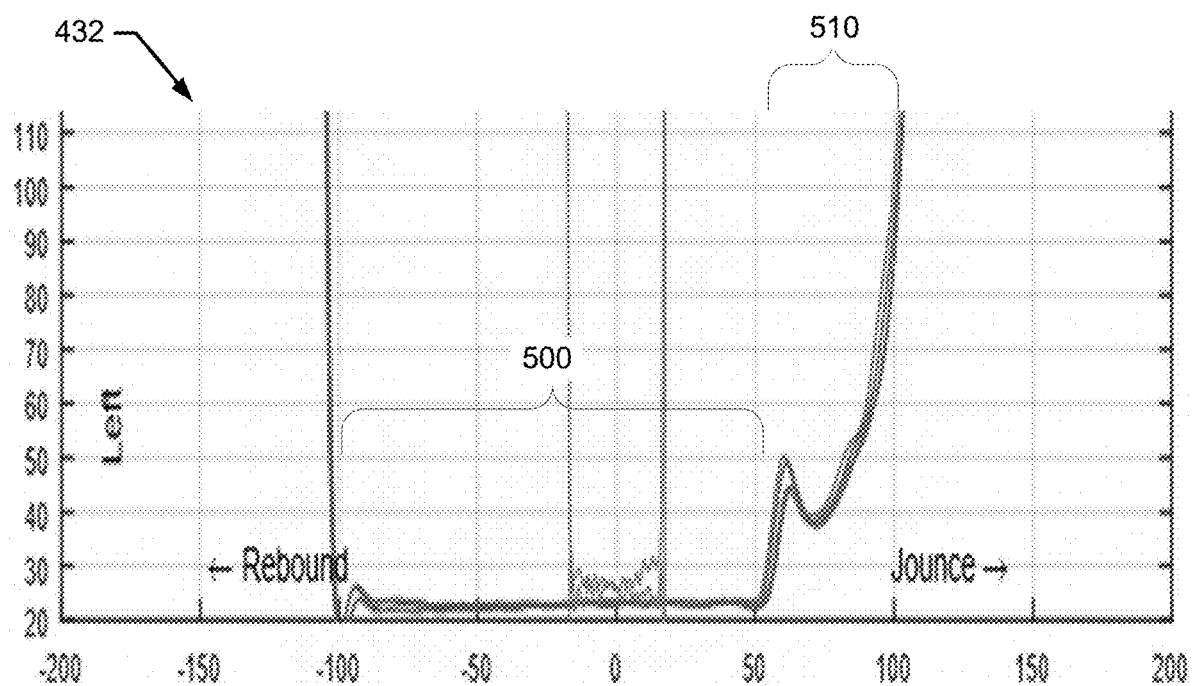
FIG. 5 is a plot of wheel rate in N/mm versus travel distance in compression and rebound directions in accordance with an example embodiment.
Figure 6:
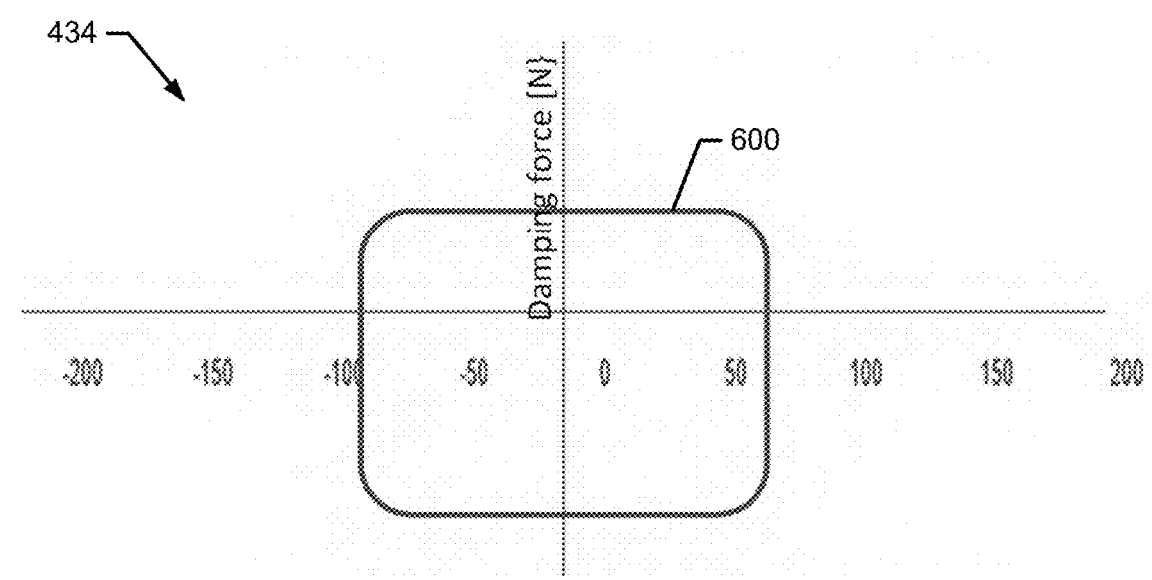
FIG. 6 is a plot of damping force versus displacement to define a bounce control zone in accordance with an example embodiment.

At operation 430, front and rear bounce motion may be optimized. This operation may optimize damping within a linear range of wheel travel for the main damper 220 in order to avoid front and rear axle bounce resonance induced pitch, and in order to avoid spring aid induced abruptness (e.g., from a typical polyurethane spring aid or stop that is conventionally used at the limit of motion). Thus, the optimization of the main damper 220 may provide two outputs including a first output 432 and a second output 434. The first output 432 is shown by the plot of FIG. 5. In this regard, FIG. 5 illustrates a region of linear travel 500, and a region of spring aid excitement 510. The second output 434 is shown in FIG. 6, which defines a bounce control zone 600 (i.e., an example of the main piston control zone 226 of FIG. 2). The bounce control zone 600 corresponds to the region of linear travel 500.

Thereafter, at operation 440, the front and rear axles are recoupled by adding pitch inertia back in. A determination may then be made as to whether the CAE model exhibits pitch resonance at operation 450. If no pitch resonance is generated, then pitch resonance has been suppressed at operation 452 and the design may be implemented with corresponding main damper 220 and first and second secondary damper 230 and 240 settings. However, if pitch resonance is detected, then a determination may be made at operation 454 as to which axle loses contact with the ground first. The tuning process may then proceed with adjustment to dampers associated with the corresponding axle that lost contact first. The axle that loses contact first may be considered to be the axle that is contributing more to approach to pitch resonance.

Accordingly, for example, if the front axle lost contact first, then flow may proceed to operation 460, at which point a determination is made as to which damper speed is higher (i.e., the first secondary damper 230 (for compression) or the second secondary damper 240 (for rebound)). Compression damper speed may be considered higher when spring aid engages at pitch resonance vehicle speed, and rebound damper speed may be considered higher when contact is lost with the road. If, for example, rebound damper speed (associated with the second secondary damper 240 of FIG.

2) is higher, then additional secondary damper force may be added to the second secondary damper at operation 470. In an example embodiment, the additional secondary damper force and/or travel distance that is added may be added in discrete increments. The increments could be chosen at any desirable level. However, for this example, assume increments of 20 mm for secondary piston position relative to maximum compression travel, and assume 1 KN of damper force.

After the adjustment of operation 470, a determination may be made as to whether a maximum damper force setting for the position sensitive damper 130 has been achieved at operation 480. If maximum damper force has not been achieved, then an additional 1 KN of damping force may be added where pitch resonance is highest (e.g., based on the speed from the curve 710 of the plot 700 of FIG. 7) at operation 482. However, if maximum damper force had been achieved, then 10 mm of additional travel distance for the secondary damper (i.e., the second secondary damper 240 for this example) may be provided instead at operation 484. Flow may then return to operation 450, at which point another determination may be made as to whether pitch resonance is experienced. The cycle may continue from operation 450 to operation 480 until pitch resonance is suppressed at operation 452. Pitch resonance may be considered to be suppressed based on a comparison of the highest peak in pitch relative to the average pitch (i.e., based on prominence of the peak). However, other methods of determining suppression may alternatively be employed.

Notably, if the determination regarding which axle loses contact first at operation 454 instead determines that the rear axle loses contact first, then flow proceeds to operation 456, which provides for a repeat of operations 460 to 480 for the rear axle. Similarly, if compression damper speed is higher responsive to performing operation 460, then operation 464 may be performed, which provides for a repeat of operations 470 to 480 for the compression damper. Force and/or travel adjustments may be made as defined in operations 470 and 480 until, as noted above, pitch resonance is suppressed at operation 452.

Figure 7:
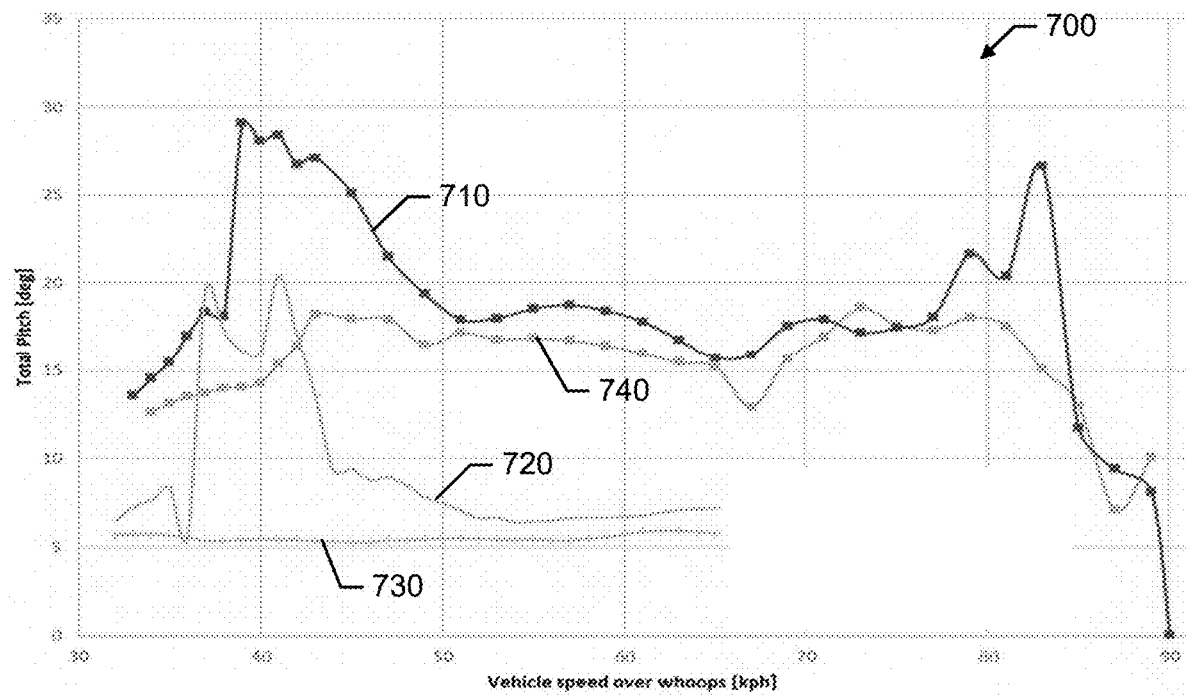
FIG. 7 illustrates graphs of pitch versus vehicle speed for various points within the process of FIG. 4 in accordance with an example embodiment.

FIG. 7 illustrates a plot 700 of pitch versus speed over a set of whoops. Curve 710 illustrates pitch measured for a conventional suspension system (i.e., without the position sensitive damper 130 of an example embodiment). High pitch values (or peaks) can be noted in curve 710 at around 40 kph and 83 kph. Curve 710 may also be similar to data that would be achieved after executing operation 440 from the process of FIG. 4. Meanwhile, curve 720 shows data relating to decoupled front and rear axle modeled performance without position sensitive damping, which corresponds to operation 420 from the process of FIG. 4. Peak levels of pitch can be seen for front axle resonance at about 38 kph and for rear axle resonance at about 41 kph. Curve 730 shows data relating to optimization of the front and rear axles for bounce, which corresponds to operation 430 from the process of FIG. 4. Finally, curve 740 shows results for completing a number of cycles of operations 450 to 480 to suppress pitch resonance. The marked reduction in pitch over the full range of speeds shown illustrates that the tuning of FIG. 4 may lead to increased contact between the wheels and the ground over the full range of speeds, and a smoother ride and greater confidence for the driver while traversing difficult terrain.

Figure 8:
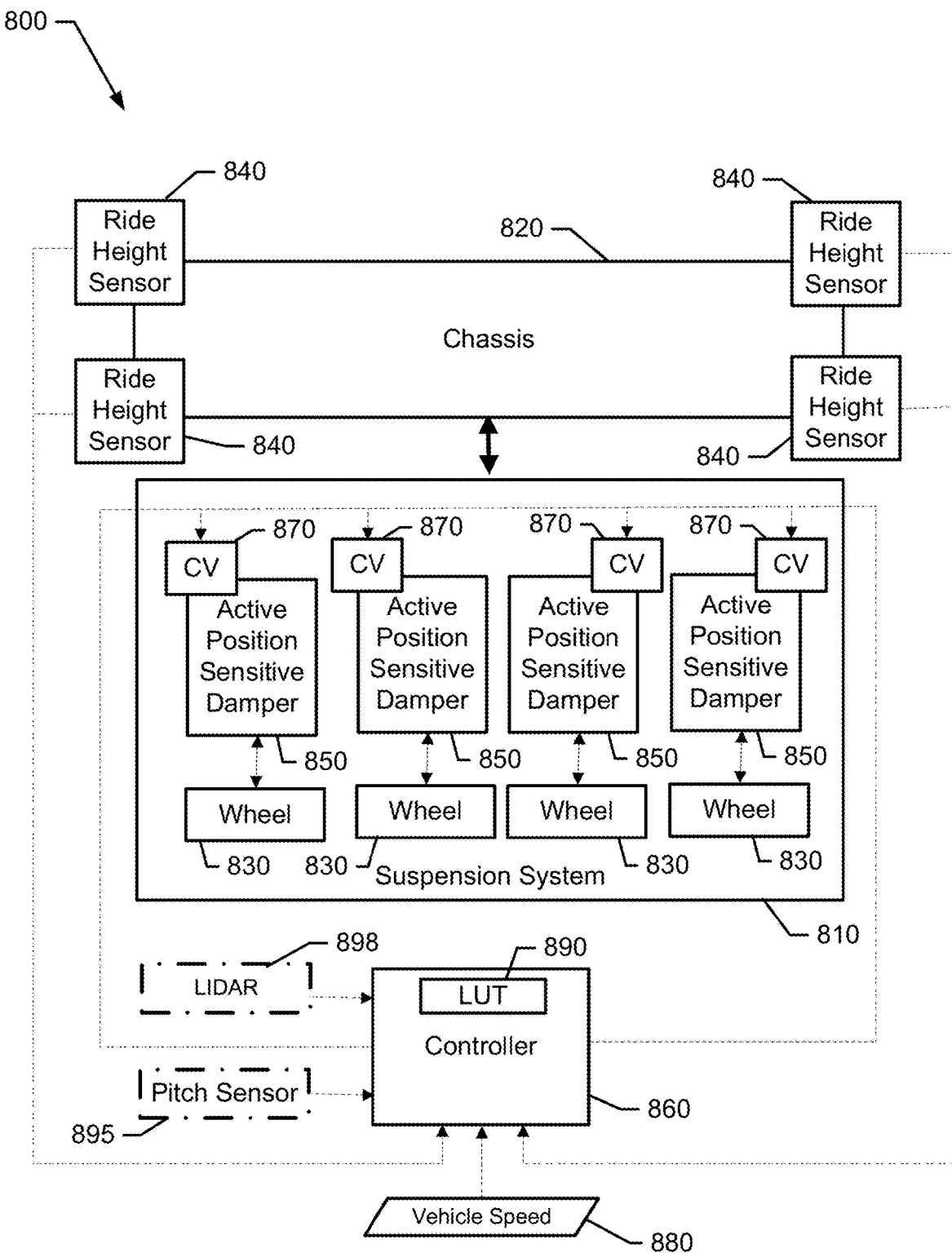
FIG. 8 illustrates a vehicle and corresponding system for employing active position sensitive damping in accordance with an example embodiment.

Although the process of FIG. 4 may be accomplished for a given vehicle design in order to define parameters for shocks in the vehicle, and such parameters may be fixed thereafter, it is also possible to provide active pitch control in some embodiments. In this regard, for example, FIG. 8 illustrates a block diagram of a vehicle 800 having an active pitch control suspension system 810 in accordance with an example embodiment. As shown in FIG. 8, the active pitch control suspension system 810 may operably couple a chassis 820 of the vehicle 800 to the ground. In this regard, the active pitch control suspension system 810 may include wheels 830, ride height sensors 840, and an active position sensitive damper 850. The ride height sensors 840 may be disposed at respective corners of the chassis 820 (e.g., a front right, front left, rear right, and rear left corner). The ride height sensors 840 and the active position sensitive damper 850 may each be operably coupled to an electronic control unit (ECU) or other controller 860 of the vehicle 800. The controller 860 (which may include processing circuitry including a processor and memory) may be operably coupled to an active element of the active position sensitive damper 850 (e.g., solenoid or otherwise electrically operated control valves (CV) 870) to actuate the active element based on a pitch control algorithm stored at or accessible to the controller 860.

In an example embodiment, the ride height sensors 840 may include sensors for each respective one of the wheels 830. Thus, for example, there may be a front left, front right, rear left, and rear right ride height sensor among the ride height sensors 840. The controller 860 may be configured to receive right height information from each of the ride height sensors 840 along with vehicle speed 880. The ride height sensors 840 may provide information that is indicative of the current loading of the vehicle 800. Based on the current loading and the vehicle speed 880, the pitch control algorithm may modify damping (and locational specific application of force) for the active position sensitive damper 850 one a wheel-by-wheel basis.

In an example embodiment, the models and processes described above in reference to FIG. 4 may be utilized with the model being modified for respective different loading levels for the vehicle (which correspond to ride height readings). Optimization values may then be determined for corresponding different loading levels and stored in a lookup table (LUT) 890 stored at or otherwise accessible to the controller 860. During operation of the vehicle 800, the controller 860 may then be configured to take inputs from the ride height sensors 840 that may be indicative of the cargo load currently borne by the vehicle 800. However, since the ride height sensors 840 are position-specific, it may not only be possible to generate an overall cargo load value, but it may be further possible to appreciate how the load is being carried by the vehicle 800. Using the information on vehicle loading determined from the ride height sensors 840, and using vehicle speed 880, the controller 860 may be configured to utilize the lookup table 890 to find optimal damping settings for the active position sensitive damper 850 associated with each respective one of the wheels 830. The controller 860 may then provide instruction to control the active position sensitive dampers 850 via the control valves 870 associated with each one.

As payload increases, pitch inertia also increases. Therefore, it may be advantageous to provide a capability to adjust suspension characteristics to match current payload status. In some examples, the controller 860 may be configured for passive position sensitive damping with the ability to account for payload. In such a system, the ride height sensors 840 (which may be internal bypasses with a live valve), may be used along with an active valve element (e.g., the control valves 870) to increase compression damping only by operation of the control valves 870 based on loading information, vehicle speed 880 and the lookup table 890. In this regard, for example, signal processing may be accomplished via the ride height sensors 840 to determine a payload estimate. The payload estimate and vehicle speed 880 may be processed with the lookup table 890 to compare current values to reference values created using the process described above in reference to FIG. 4. Adjustments may then be made to compression damping for each respective one of the wheels 830 based on the payload estimate and speed.

In some cases, instead of only providing compression compensation only, the controller 860 may further be enabled to also provide compression and rebound damping adjustments. In this regard, for example, the controller 860 may be configured to employ continuous damping control with adjustments to both compression and rebound damping using the method described above. In this regard, for example, signal processing may be accomplished via the ride height sensors 840 to determine a payload estimate. The payload estimate and vehicle speed 880 may be processed with the lookup table 890 to compare current values to reference values created using the process described above in reference to FIG. 4. Adjustments may then be made to compression damping and/or rebound damping for each respective one of the wheels 830 based on the payload estimate and speed.

In some embodiments, a vehicle pitch sensor 895 (shown in dotted lines in FIG. 8 to distinguish the vehicle pitch sensor 895 as optional in some embodiments) may be added to the system shown in FIG. 8. The system may operate similar to the example described above except that the vehicle pitch sensor 895 may further enable direct sensing of whether the front or rear suspension is phasing in or out of phase with pitch motion. This additional information may further inform the controller 860 with regard to susceptibility to providing excitation toward resonance, and may be used to modify damping for both compression and rebound as described in the immediately preceding example.

In yet another example, a lidar detector 898 may be added (also shown in dotted lines in FIG. 8 to illustrate its optional nature). The lidar detector 898 may be used for road surface detection. Information regarding the road surface may further be included in determinations made by the controller 860 with regard to damping adjustments for compression and/or rebound for each respective one of the wheels 830 (e.g., via the corresponding active position sensitive damper 850 associated therewith).

Example embodiments may provide improved pitch control and enable higher speeds over whoops while enjoying improved comfort and a greater confidence in the feel of the ride. Example embodiments may also provide improved yaw stability and avoidance of coming into proximity of conditions where pitch resonance may be reached. Moreover, the active system of FIG. 8 could be configured such that providing the adjustment to damping compensation is done automatically and without driver input. However, in alternative embodiments, the driver may initiate such compensation, or such compensation may only be performed in certain modes that may be selectable by the operator (e.g., an off-road driving mode, automatic pitch control mode, etc.)

A position sensitive suspension system for a vehicle may therefore be provided. The system may include a plurality of ride height sensors at locations of a chassis of the vehicle corresponding to respective wheels of the vehicle, a plurality of active position sensitive dampers that are each associated with one of the respective wheels of the vehicle, and a controller operably coupled to the ride height sensors and the active position sensitive dampers. The controller may be configured to determine a payload estimate based on information received from the ride height sensors. The controller may be further configured to provide an adjustment to compensation damping of at least one of the active position sensitive dampers based on the payload estimate and vehicle speed.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the active position sensitive dampers may each include an electrically operable control valve, and the controller may provide an instruction to the electrically operable control valve to provide the adjustment to compensation damping. In an example embodiment, the controller may be configured to provide the adjustment to compensation damping of the at least one of the active position sensitive dampers based on pitch information from a pitch sensor. In some cases, the controller may be configured to provide the adjustment to compensation damping of the at least one of the active position sensitive dampers based on road surface information from a lidar detector. In an example embodiment, the controller may be configured to provide the adjustment to compensation damping of each of the active position sensitive dampers. In some cases, each active position sensitive damper may include a main damper configured to have a range of motion through a bounce control zone, a secondary damper for compression disposed in a compression zone at one end of the bounce control zone, and a secondary damper for rebound disposed in a rebound zone at the other end of the bounce control zone. In an example embodiment, providing the adjustment to compensation damping may include adjusting the secondary damper for compression. However, in some cases, providing the adjustment to compensation damping may include adjusting the secondary damper for compression and/or the secondary damper for rebound. In an example embodiment, providing the adjustment to compensation damping may include adjusting the active position sensitive damper based on a lookup table defining damping settings based on payload and vehicle speed. In some cases, providing the adjustment to compensation may be provided automatically and without driver input.

A method of optimizing a suspension system to avoid pitch resonance may include determining pitch characteristics of a vehicle for a terrain profile and speed range via a model associated with the vehicle, decoupling front and rear axles by removing pitch inertia from the model, and determining optimized damping for a main damper of a position sensitive damper over a linear range of wheel travel in a bounce control zone based on the pitch characteristics. The method may further include recoupling the front and rear axles by adding the pitch inertia back into the model, and selecting a secondary damper associated with a compression zone or a secondary damper associated with a rebound zone as a selected damper for adjustment based on which of the front and rear axles is limiting. The method may also include performing a damping adjustment to the selected damper and cyclically repeating selecting the secondary damper and performing the damping adjustment until pitch resonance is suppressed.

The method of some embodiments may include additional steps, modifications, augmentations and/or the like to achieve further objectives or enhance performance of the method. The additional steps, modifications, augmentations and/or the like may be added in any combination with each other. Below is a list of various additional steps, modifications, and augmentations that can each be added individually or in any combination with each other. For example, determining pitch characteristics may include determining a pitch resonance frequency, a front axle bounce resonance frequency and a rear axle bounce resonant frequency of the modeled vehicle. In an example embodiment, determining optimized damping for the main damper may include determining a damping force for the main damper to avoid front axle bounce resonance induced pitch and avoid rear axle bounce resonance induced pitch, and to avoid operation of a spring aid proximate to a travel limit of the main damper. In some cases, selecting the secondary damper may include selecting the front axle as limiting if the front axle is modeled to lose contact with the ground before the rear axle, and selecting the rear axle as limiting if the rear axle is modeled to lose contact with the ground before the front axle. In an example embodiment, performing the damping adjustment may include performing the damping adjustment to the secondary damper for a zone associated with a higher damper speed, adding secondary damper force in a predefined increment, or adding secondary damper travel distance in a predefined increment. In some cases, performing the damping adjustment may include adding secondary damper force or travel distance and determining whether maximum damper force is achieved and, if the maximum damper force is achieved, providing additional adjustment of the travel distance, and, if the maximum damper force is not achieved, providing additional adjustment of the damper force. In some cases, providing additional adjustment of the damper force may include adding damping force at a damper speed where pitch resonance is highest.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed:

1. A position sensitive suspension system for a vehicle, the system comprising:
a plurality of ride height sensors at locations of a chassis of the vehicle corresponding to respective wheels of the vehicle;
a plurality of active position sensitive dampers, each active position sensitive damper being associated with one of the respective wheels of the vehicle; and
a controller operably coupled to the ride height sensors and the active position sensitive dampers,
wherein the controller is configured to:
determine pitch characteristics of a vehicle for a terrain profile and speed range via a model associated with the vehicle;
determine optimized damping for a main damper of a position sensitive damper over a linear range of wheel travel in a bounce control zone based on the pitch characteristics;
select a secondary damper associated with a compression zone or a secondary damper associated with a rebound zone as a selected damper for adjustment based on which of the front and rear axles is limiting;
perform a damping adjustment to the selected damper; and
cyclically repeat selecting the secondary damper and performing the damping adjustment until pitch resonance is suppressed.

2. The system of claim 1, wherein determining pitch characteristics comprises determining a pitch resonance frequency, a front axle bounce resonance frequency and a rear axle bounce resonant frequency of the modeled vehicle.

3. The system of claim 1, wherein determining optimized damping for the main damper comprises determining a damping force for the main damper to avoid front axle bounce resonance induced pitch and avoid rear axle bounce resonance induced pitch, and to avoid operation of a spring aid proximate to a travel limit of the main damper.

4. The system of claim 1, wherein selecting the secondary damper comprises selecting the front axle as limiting if the front axle is modeled to lose contact with the ground before the rear axle, and selecting the rear axle as limiting if the rear axle is modeled to lose contact with the ground before the front axle.

5. The system of claim 4, wherein performing the damping adjustment comprises performing the damping adjustment to the secondary damper for a zone associated with a higher damper speed.

6. The system of claim 1, wherein performing the damping adjustment comprises adding secondary damper force in a predefined increment.

7. The system of claim 1, wherein performing the damping adjustment comprises adding secondary damper travel distance in a predefined increment.

8. The system of claim 1, wherein performing the damping adjustment comprises adding secondary damper force or travel distance and determining whether maximum damper force is achieved and:
if the maximum damper force is achieved providing additional adjustment of the travel distance, and
if the maximum damper force is not achieved providing additional adjustment of the damper force.

9. The system of claim 8, wherein providing additional adjustment of the damper force comprises adding damping force at a damper speed where pitch resonance is highest.

10. A method of optimizing a suspension system to avoid pitch resonance, the method comprising:
- determining, by a processor/controller, pitch characteristics of a vehicle for a terrain profile and speed range via a model associated with the vehicle;
- determining, by the processor/controller, optimized damping for a main damper of a position sensitive damper over a linear range of wheel travel in a bounce control zone based on the pitch characteristics;
- selecting a secondary damper associated with a compression zone or a secondary damper associated with a rebound zone as a selected damper for adjustment based on which of the front and rear axles is limiting;
- performing a damping adjustment to the selected damper; and
- cyclically repeating selecting the secondary damper and performing the damping adjustment until pitch resonance is suppressed.

11. The method of claim 10, wherein determining pitch characteristics comprises determining a pitch resonance frequency, a front axle bounce resonance frequency and a rear axle bounce resonant frequency of the modeled vehicle.

12. The method of claim 10, wherein determining optimized damping for the main damper comprises determining a damping force for the main damper to avoid front axle bounce resonance induced pitch and avoid rear axle bounce resonance induced pitch, and to avoid operation of a spring aid proximate to a travel limit of the main damper.

13. The method of claim 10, wherein selecting the secondary damper comprises selecting the front axle as limiting if the front axle is modeled to lose contact with the ground before the rear axle, and selecting the rear axle as limiting if the rear axle is modeled to lose contact with the ground before the front axle.

14. The method of claim 13, wherein performing the damping adjustment comprises performing the damping adjustment to the secondary damper for a zone associated with a higher damper speed.

15. The method of claim 10, wherein performing the damping adjustment comprises adding secondary damper force in a predefined increment.

16. The method of claim 10, wherein performing the damping adjustment comprises adding secondary damper travel distance in a predefined increment.

17. The method of claim 10, wherein performing the damping adjustment comprises adding secondary damper force or travel distance and determining whether maximum damper force is achieved and:
- if the maximum damper force is achieved providing additional adjustment of the travel distance, and
- if the maximum damper force is not achieved providing additional adjustment of the damper force.

18. The method of claim 17, wherein providing additional adjustment of the damper force comprises adding damping force at a damper speed where pitch resonance is highest.

* * * * *